No. 809,877. PATENTED JAN. 9, 1906.
A. WILLIAMS.
BINDER ATTACHMENT.
APPLICATION FILED JUNE 23, 1905.

WITNESSES:
Jos. A. Ryan
J. Middleton

INVENTOR
Albert Williams
BY Munn & Co
ATTORNEYS

UNITED STATES PATENT OFFICE.

ALBERT WILLIAMS, OF JOLIET, MONTANA.

BINDER ATTACHMENT.

No. 809,877.  Specification of Letters Patent.  Patented Jan. 9, 1906.

Application filed June 23, 1905. Serial No. 266,592.

*To all whom it may concern:*

Be it known that I, ALBERT WILLIAMS, a citizen of the United States, and a resident of Joliet, in the county of Carbon and State of Montana, have invented certain new and useful Improvements in Binder Attachments, of which the following is a specification.

My invention is an improvement in self-binding harvesters, and has for an object to provide a novel construction by which to collect and save grain and grass-seed which are ordinarily wasted off the deck of the binder; and the invention consists in certain novel constructions and combinations of parts, as will be hereinafter described and claimed.

Figure 1:
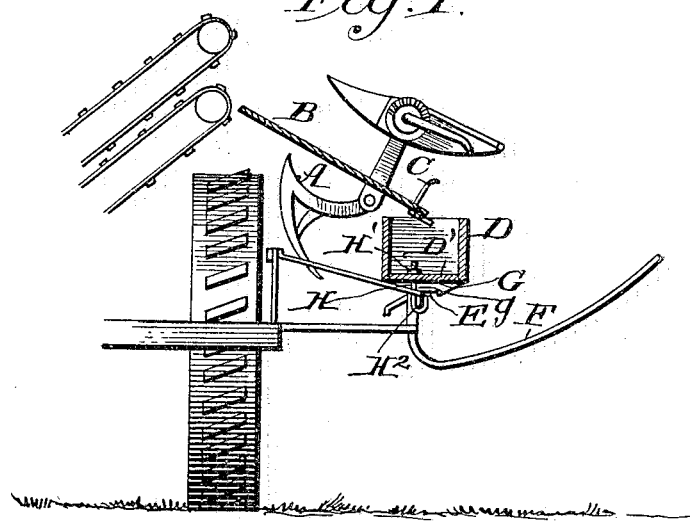
Figure 2:
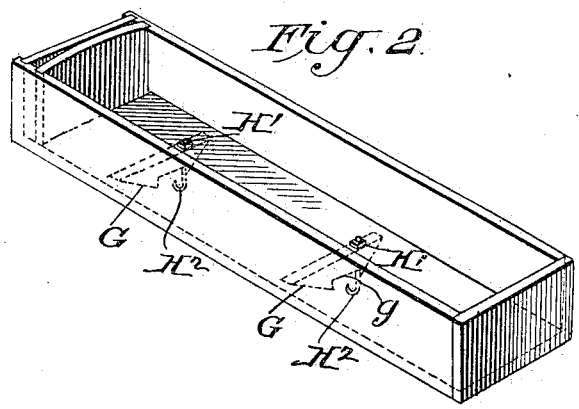
Figure 3:
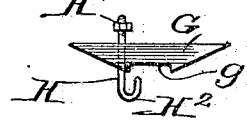

In the drawings, Figure 1 is a cross-sectional view, parts being broken away, of a portion of a harvester embodying my invention. Fig. 2 is a detail perspective view of the box; and Fig. 3 is a detail view of one of the packing-blocks, showing the hooked bolt in connection therewith.

As will be understood from Fig. 1, the binder-frame, needle A, deck B, trip C, and other parts of the binder may be of any desired construction. By my present invention I support the box D, which is arranged to receive grass, grain, or other seed from the deck B, upon the longitudinal angle-bar E, to which the bundle-carrier fingers F are attached. This supports the box D directly below the lower edge of the deck B and in such position that it will not interfere with the delivery of bundles to the bundle-carrier fingers F.

The angle-bar E is suitably supported, and upon it I arrange a pair of packing-blocks or saddles G, which are recessed in their lower faces at $g$ to fit upon the upper horizontal wing of the angle-bar, and these saddles G are made sufficiently long to extend laterally beyond the angle-bar and form a broad rest or support for the box D. Hook-bolts H, one for each of the saddles G, extend upwardly through the said saddles and thence through the bottom D' of the box D and are secured by nuts H'. The lower ends of the bolts H are hooked at $H^2$, the hooks opening upwardly and being adapted to engage the lower edge of the upright wing of the angle-bar, so that when the nuts H' are tightened the bolts will operate to secure the saddles G to the bottom of the box D and will also operate to secure said parts in firm connection with the angle-bar, as shown in the drawings. By this construction the box can be readily applied and removed and will be held securely in place when applied, as will be understood from the drawings.

In the operation of the binder it will be noticed that the grain and grass-seed that are shelled out in the process of harvesting and ordinarily wasted will discharge into the box D and when collected therein may be removed in any suitable manner. This may ordinarily be effected by providing the box with a removable end-gate, which can be opened and the seed discharged at the open end of the box, as will be readily understood by those skilled in the art.

Having thus described my invention, what I claim as new, and desire to secure by Letters Patent, is—

1. The combination substantially as herein described of the binder-deck, the angle-bar extending beneath the lower edge thereof and having an upper horizontal wing, and a depending vertical wing, bundle-carrier fingers below the said angle-bar, the saddles or packing-blocks recessed in their lower edges to receive the horizontal wing of the angle-bar and extending laterally beyond the said angle-bar to form a broad rest or seat for the box, the box on said saddles, and the bolts extending upwardly through the saddles and the bottom of the box and secured within the latter and having their lower ends hooked to engage beneath the upright wing of the angle-bar, substantially as set forth.

2. The combination with the deck and the bundle-carrier fingers, of the angle-bar below the deck, the box above the angle-bar, and the bolts connected with the box and having a hooked engagement with the angle-bar, substantially as set forth.

3. The combination of the deck, the angle-bar below the deck, the saddles or packing-blocks recessed in their lower faces to fit the angle-bar, the box, and means for securing the box, saddles and angle-bar together, substantially as set forth.

4. In a seed-saving attachment for binders, the combination of the deck, a box, and saddles or packing-blocks adapted to fit below the box, and having their lower faces recessed to fit the finger-supporting bar and means for supporting such bar below the deck, substantially as set forth.

5. A seed-saving attachment for binders consisting in combination with the deck of the box below the deck, the saddles or packing-blocks fitted beneath the box and recessed in their lower faces and having vertical openings adjacent to said recess, the finger-supporting bar and the bolts for securing the saddles or packing-blocks, said bolts having their lower ends hooked into engagement with the finger-supporting bar, substantially as set forth.

6. The combination with the deck, of the angle-bar below the deck, the box between the angle-bar and deck and the bolts connected with the box and hooked at their lower ends into engagement with the angle-bar, substantially as set forth.

7. The combination in a harvester with the deck, the box below the deck, the saddles or packing-blocks extending transversely beneath the box and the harvester-frame having the angle-bar upon which said saddles or packing-blocks rest, of the bolts connected with the box and hooked at their lower ends into engagement with the angle-bar, substantially as set forth.

8. The combination of the deck, the angle-bar below the deck, the saddles or packing-blocks upon the angle-bar, the box upon the saddles and below the deck and the bolts extending upwardly through the saddles and the bottom of the packing-box and having their lower ends hooked for engagement with the angle-bar, substantially as set forth.

ALBERT WILLIAMS.

Witnesses:
 DAVID LAY,
 LUCIUS WHITNEY.